Patented Oct. 24, 1933

1,931,518

UNITED STATES PATENT OFFICE 1,931,518

TRANSPARENT CELLULOSIC FILM

James F. Walsh, South Orange, N. J., assignor to Celluloid Corporation, a corporation of New Jersey No Drawing. Application July 29, 1929
Serial No. 382,088

11 Claims. (Cl. 91—68)

This invention pertains to the general class of cellulosic plastics and particularly to the class of cellulosic plastics adapted for use where a highly transparent product is desired. It pertains more particularly to film made with cellulose acetate and reinforced with a reticular material such as textile or metal fabric, which, among other things, is employed as a glass substitute as well as to film used for photographic and other purposes.

Film when used in the place of glass is generally reinforced with wire cloth and should be transparent not only to the visual rays, but to the ultraviolet rays as well. It is of course known that ordinary glass cuts off a very high percentage of the ultraviolet rays which are so necessary to health and growth of human beings, animals and plants.

An object of this invention is to provide a composition that is capable of transmitting a very high percentage of ultraviolet rays.

A further object of this invention is to provide a composition that is substantially unaffected by moisture.

A further object of this invention is to provide a composition in which the plasticizers do not appreciably exude.

A further object of this invention is to provide a composition which is substantially non-inflammable; that can be polished or molded under heat and pressure without separation of components; that exhibits a marked resistance to discoloration by light and heat; that may be satisfactorily substrated with gelatin emulsion; that does not have ingredients which tend to hydrolize and form acidic products; that does not emit objectionable odors; that is relatively low in cost; that is highly transparent; that does not cause a bloom or cloudiness upon being bent; that is strong and tough in character, and that is otherwise highly satisfactory for its intended purpose.

Many other objects and advantages will appear to persons skilled in the art as the specification proceeds.

In my novel composition I preferably employ along with cellulose acetate, specific proportions of an aromatic phosphate and an ester of tartaric acid. I preferably do not exceed 20 parts of aromatic phosphates to 100 parts of cellulose acetate, and prefer not to fall below 10 parts. For the purpose of transmitting a very high percentage of ultraviolet rays, I prefer to stay within the limits of from 12 to 17 parts. I prefer not to exceed 20 parts of esters of tartaric acid to 100 parts of cellulose acetate, and prefer not to go below 10 parts. For the purpose of obtaining a very high transmission of ultraviolet rays, I prefer to stay within the limits of 12 to 17 parts.

The following formula produces excellent results. However, it is understood that this formula is given merely by way of illustration, and that the invention is not limited thereto.

| | Parts |
|---|---|
| Cellulose acetate | 100 |
| Triphenyl phosphate | 15 |
| Dibutyl tartrate | 15 |

The ingredients may be mixed and colloided in any of the usual ways, preferably with the aid of a suitable solvent such as acetone, ethyl lactate, ethyl methyl ketone, etc., or any of the known combinations of ethyl alcohol, methyl alcohol, acetone, chloroform, benzol, amyl acetate, ethyl lactate, ethyl methyl ketone, and/or other more or less volatile mixtures as found most effective for the results desired to form a dope suitable for film casting purposes on a suitable surface, or the formation of a film upon reticular material such for instance, as wire cloth.

For film casting purposes a wheel or belt or any other apparatus known in the art may be employed. For forming a film upon reticular material such, for instance, as wire cloth, same may be passed through a solution of dope in a manner to permit draining off of excess material and then passed through a drier to harden the film. Apparatus for this purpose is known in the art and does not constitute a part of this invention.

With the formula given above, I prefer to use a solvent composed of 85% acetone and 15% industrial ethyl alcohol. The specific proportions, however, may be varied somewhat. For instance, 80% to 90% acetone and 10% to 20% ethyl alcohol produce good results. This proportion of ingredients is desired in order to obtain a dope having the lowest viscosity with the least amount of solvent, as well as a solvent of the desired volatility to produce proper strength and a practicable rate of production of film, a solvent that is non-toxic, neutral and commercially available in a form substantially free from impurities likely to prove detrimental to the final product, a solvent that is inert to the action of light, and that is composed of ingredients capable of being separated in substantially definite fractions.

After the ingredients are mixed and colloided in a kneader or otherwise, and sufficient solvent added to form a dope, this dope is filtered and is then ready to be placed either in the hopper of film casting apparatus or in the dope container of apparatus for forming a film upon reticular material such as wire cloth.

In place of dibutyl tartrate, monobenzyl tartrate, dibenzyl tartrate and diamyl tartrate may be employed. Fair results have been obtained by the use of diethyl tartrate and dimethyl tartrate. However, the latter compounds exhibit a certain solubility in water, and for that reason are not preferred for this type of work. Dipropyl tartrate may also be used.

Tricresyl phosphate or other aromatic phosphates may be substituted for the triphenyl phosphate.

Film made with my novel composition is strong and tough; is substantially non-inflammable; is capable of being molded under heat and pressure without separation of components; is resistant to the action of water; resists discoloration from light and heat, can be satisfactorily substrated with unusually improved results; does not produce a cloudiness upon being bent; does not exude; and is otherwise highly satisfactory for glass substitute, moving picture, X-ray, ordinary cameras, and similar purposes.

It is, of course, understood that this novel composition may also be used for other purposes and in such event can be processed in any of the ways employed with cellulosic plastics. Sheets made from my composition are very suitable for many purposes where a highly transparent product is desired, such as in laminated glass manufacture, curtains for automobiles, lamp shades, etc., etc. The dope may also be used satisfactorily for coating other than reticular materials, such as in lacquers, etc. If a transparent product is not desired, pigments and fillers may be added to produce color and other effects such as gypsum, talc, mica, barytes, clay, titanium oxide, iron oxide, cork, leather, rubber, cotton waste, wood flour, gum, etc., etc., either in granulated, pulverized or other form. Color effects may also be produced by means of dyes and lakes if desired. An unlimited variety of effects may thus be produced.

While the use of dibutyl tartrate is preferred, it is of course understood that other tartrate esters of either the aliphatic or aromatic group may be employed. Of the other esters of tartaric acid thus employed, those of comparatively low volatility and comparatively high insolubility in water are preferred. However, others may be employed if desired, particularly for special purposes.

Having described my invention it is understood that the particular description is given merely by way of illustration, and that many variations may be made in the same within the scope of the claims without departing from the spirit of the invention.

I claim:

1. Glass substitute comprising a reticular material covered with a transparent film of cellulosic plastic permeable to ultraviolet light comprising 100 parts cellulose acetate, 10 to 20 parts of an aromatic phosphate and 10 to 20 parts of an ester of tartaric acid.

2. Glass substitute comprising a reticular material covered with a transparent film of cellulosic plastic permeable to ultraviolet light comprising 100 parts of cellulose acetate, 12 to 17 parts of an aromatic phosphate, and 12 to 17 parts of an ester of tartaric acid.

3. Glass substitute comprising a reticular material covered with a transparent film of cellulosic plastic permeable to ultraviolet light comprising 100 parts cellulose acetate, 10 to 20 parts triphenyl phosphate and 10 to 20 parts dibutyl tartrate.

4. Glass substitute comprising a reticular material covered with a transparent film of cellulosic plastic permeable to ultraviolet light comprising 100 parts of cellulose acetate, 12 to 17 parts of triphenyl phosphate, and 12 to 17 parts of dibutyl tartrate.

5. Glass substitute comprising a reticular material covered with a transparent film of cellulosic plastic permeable to ultraviolet light comprising 100 parts of cellulose acetate, 15 parts of triphenyl phosphate and 15 parts of dibutyl tartrate.

6. The process of making articles permeable to ultraviolet light comprising closely combining 100 parts cellulose acetate, 12 to 17 parts triphenyl phosphate and 12 to 17 parts dibutyl tartrate by the aid of a solvent composed of acetone and alcohol to form a dope and forming film upon a reticular material from said dope.

7. The process of making articles permeable to ultraviolet light comprising closely combining 100 parts cellulose acetate, 10 to 20 parts of an aromatic phosphate and 10 to 20 parts of an ester of tararic acid by the aid of a solvent to form a dope and forming film upon a reticular material from said dope.

8. An article of manufacture permeable to utraviolet light comprising a transparent film or sheet containing 100 parts of cellulose acetate, 10 to 20 parts of an aromatic phosphate, and 10 to 20 parts of an ester of tartaric acid.

9. An article of manufacture permeable to ultraviolet light comprising a transparent film or sheet containing 100 parts of cellulose acetate, 12 to 17 parts of an aromatic phosphate and 12 to 17 parts of an ester of tartaric acid.

10. An article of manufacture permeable to ultraviolet light comprising a transparent film or sheet containing 100 parts of cellulose acetate, 12 to 17 parts of triphenyl phosphate and 12 to 17 parts of dibutyl tartrate.

11. An article of manufacture permeable to ultraviolet light comprising a transparent film or sheet containing 100 parts of cellulose acetate, 15 parts of triphenyl phosphate and 15 parts of dibutyl tartrate.

JAMES F. WALSH.